United States Patent [19]

Yang

[11] Patent Number: 4,663,579

[45] Date of Patent: May 5, 1987

[54] INTERCONNECTING CIRCUIT FOR CONNECTING ONE D.C. VOLTAGE SOURCE TO ANOTHER

[76] Inventor: Tai-Her Yang, 5-1 Taipin St., Si-Hu Town, Dzan-Hwa, Taiwan

[21] Appl. No.: 819,115

[22] Filed: Jan. 15, 1986

[51] Int. Cl.$^4$ .............................................. H02J 7/00
[52] U.S. Cl. ...................................... 320/26; 320/48; 361/77
[58] Field of Search .................. 320/25, 26, 48; 361/77

[56] References Cited

U.S. PATENT DOCUMENTS

| | | | |
|---|---|---|---|
| 3,273,039 | 9/1966 | Godshalk et al. | 320/26 |
| 3,659,183 | 4/1972 | Carlson | 320/25 |
| 4,238,722 | 12/1980 | Ford | 320/25 |
| 4,463,402 | 7/1984 | Cottrel | 361/77 |
| 4,527,111 | 7/1985 | Branhan | 320/26 |

FOREIGN PATENT DOCUMENTS

| | | |
|---|---|---|
| 0340418 | 1/1931 | United Kingdom . |
| 0479333 | 2/1938 | United Kingdom . |
| 0615081 | 12/1948 | United Kingdom . |
| 1146563 | 3/1969 | United Kingdom . |
| 1225531 | 3/1971 | United Kingdom . |
| 1270799 | 4/1972 | United Kingdom . |
| 1576096 | 10/1980 | United Kingdom . |

Primary Examiner—Patrick R. Salce
Assistant Examiner—Anita M. Ault
Attorney, Agent, or Firm—Leonard Bloom

[57] ABSTRACT

An interconnecting circuit for connecting a first d.c. source to a second d.c. source. The circuit includes a first conductive connection extending between one terminal of the first source and one terminal of the second source, the first conductive connection including a first pair of relay contacts and a second pair of relay contacts. A second conductive connection extends between a second terminal of the first source and a second terminal of the second source, the second conductive connection being free of relay contacts. A first polarity responsive circuit includes a first relay winding coupled across the first d.c. source for energizing the first relay winding whenever the first d.c. source is connected in a given polarity, the first pair of contacts being closed whenever the first relay winding is energized. A second polarity responsive circuit includes a second relay winding coupled across the second d.c. source for energizing the second relay winding whenever the second d.c. source is connected in the given polarity. The second pair of contacts are closed whenever said second relay winding is energized.

17 Claims, 7 Drawing Figures

INTERCONNECTING CIRCUIT FOR CONNECTING ONE D.C. VOLTAGE SOURCE TO ANOTHER

BACKGROUND OF THE INVENTION

The present invention uses polarity detecting relay means to limit direction of current flow in the wiring of batteries between two vehicles. The relay arrangement allows electric current to flow and charging to begin, when the wiring is correct. In reverse, the relay arrangement cuts out automatically, if the wiring is wrong.

SUMMARY OF THE INVENTION

The conventional jumper cable between two vehicles uses usually a long cable having a double line wire. A respective line clamp is installed respectively at the two ends of each line wire for clamping to respective terminals of the batteries in the two vehicles.

Due to negligence of the driver or poor visibility on a dark night, short circuiting may result on the wires. Furthermore, such fault occurs often, when the battery is charged from a charger. The circuit of the present invention uses the polarity detecting relay arrangement to make the electric circuit cut off when it is incorrectly connected. It also may function to provide an indication of an incorrect connection and can improve the above-indicated defects.

DETAILED DESCRIPTION OF THE PREFERRED EMBODIMENTS

This invention concerns an improved design of an interconnecting ("jumper") circuit between two batteries in different vehicles or from a charger. As known by the people, direct charging between two batteries is usually done in the outdoors or in the absence of a power supply or charger. It is a temporary method for charging the battery having an insufficient electric charge. The correct method for effecting this operation is as follows:

1. the positive pole of one battery connects with the positive pole of the other and the negative pole of the one battery connects with the negative pole of the other; and
2. the battery to be charged should not make a short circuit, otherwise the connecting wires will overheat the battery may be destroyed.

Figure 1A:
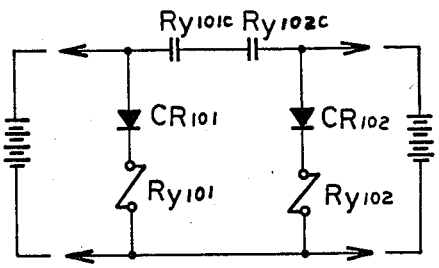
FIG. 1A is a schematic diagram of an exemplary embodiment of an interconnecting ("jumper") circuit having polarity detecting relay arrangement in accordance with the present invention.
Figure 1B:
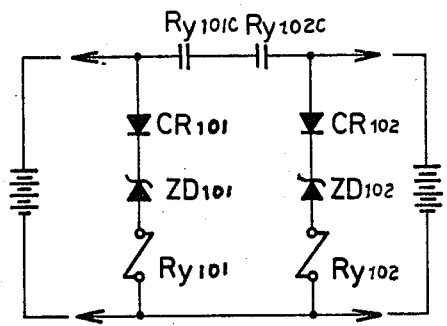
FIG. 1B is a schematic diagram of a variant of circuit of FIG. 1A, the polarity detecting relay arrangement being connected with voltage-limiting Zener diodes in series.

Whenever an operator has insufficient knowledge, or is negligent, or it is too dark, wrong connected polarities may happen. Therefore, applicant has provided the polarity detecting relay arrangement of the present invention to protect it. Its applicable example is shown in FIG. 1A. Its main principle lies in that the wire clamps are installed respectively at the two ends of positive conducting wire of the interconnecting ("jumper") circuit, in which respective polarity detecting relay sets composed of respective relay windings RY101 and RY102 are installed on a section. One end of the respective polarity detecting relay windings RY101 and RY102 connects in positive direction in series with respective diodes CR101 and CR102 which have their anodes connected to the positive conducting wires. When two ends have corrective polarities, current flows in the winding RY101 which causes the pair of contacts RY101C to close; current also flows in the winding RY102 causing the pair of contacts RY102C to close. The two ends of negative conducting wire, also provided with the clamps, connect to the free terminals of the windings RY101 and RY102 which are conductively connected to one another. When the polarities of two ends are correct, the closed pairs of contacts RY101C and RY102C allow electric current to flow for charging between the two batteries. When a battery has too little remaining charge to drive its relay, the charging electric current is cut off. Because battery-to-battery charging is used only for an insufficient electric charge condition of a battery, the two batteries may both become over-heated due to too large charging current, when a battery has become discharged completely. Therefore, this state should be avoided. In order to detect the state of this insufficient terminal voltage condition, the minimum activating terminal voltage can be selected respective Zener diodes ZD101, ZD102 connected respectively between the respective diodes CR101, CR102 and the relay windings RY101, RY102 (as shown in FIG. 1B). If any pole has an incorrect connection polarity, the polarity detecting relay set will not act, due to reverse obstruction of the diode CR101 or CR102, so that at least one of the pairs of contacts RY101C, RY102C remains open and the protective function is achieved. Furthermore, the pairs of contacts of above-said polarity detecting relay arrangement can be alternatively installed in series in the negative conducting wire.

Figure 2:
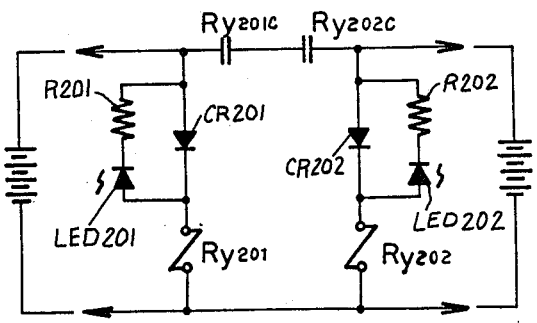
FIG. 2 is a schematic diagram of a variant of the circuit of FIG. 1A with a wrong polarity indicating LED arrangement.

A further variant is shown in FIG. 2, in which the respective diodes CR201, CR202 having reverse polarity in parallel and with respective LED201, LED202 having respective limiting resistors R201, R202 in series therewith to display the reverse polarity connection when present, the respective LED201 or the LED202 emitting light when one or the other of the diodes CR201, CR202 is nonconducting.

Moreover, the elements such as polarity detecting relay set, LED and over current breaker as shown in FIGS. 1A, 1B and 2 can be installed in a housing or installed respectively near by the ends of the charging wire. This structure results in a new effect, i.e. when the charging current is too large, a very large voltage drop results along the charging wire and the relay on the load side switches out and then switches on again, so that a switching cycle is formed. This switching cycle can delay the steady state cycle using a delay electric circuit, functioning somewhat like an automatic return type over-current circuit breaker, and charge the battery initially intermittently.

Figure 3:
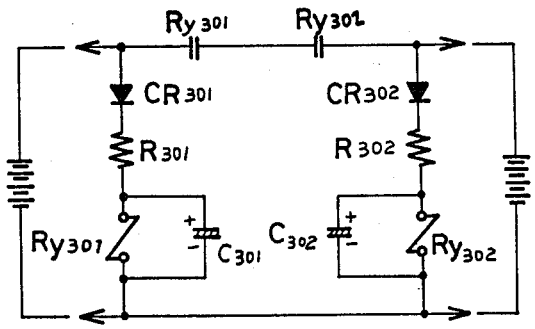
FIG. 3 is a schematic diagram of a variant of the circuit of FIG. 1A with a delay electric circuit arrangement.

FIG. 3 is an applicable example of a variant, in which additionally a delay electric circuit is provided. Respective capacitors C301 and C302 have been connected respectively in parallel across the respective detecting relay set windings RY301, RY302 and respectively in series with resistors R301, R302 and the respective diodes CR301, CR302. When the electric charging current flows through the pairs of contacts RY301C, RY302C between the batteries, resistor R301 with capacitor C301 and resistor R302 with capacitor C302 act to provide delay in the appearance of the full voltage across relay windings RY301, RY302, respectively. When either battery has insufficient voltage, the associated one of the capacitors discharges and an off-delay is generated, so that its off and on cycle can be postponed and the voltage of charged battery can rise slowly.

Figure 4:
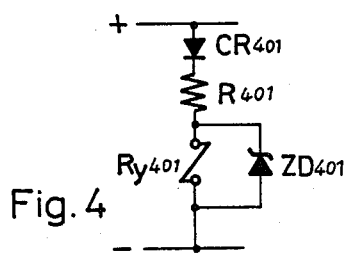
FIG. 4 is a schematic diagram of a circuit of a polarity detecting relay arrangement having a conventional Zener diode providing constant voltage across its winding.
Figure 5:
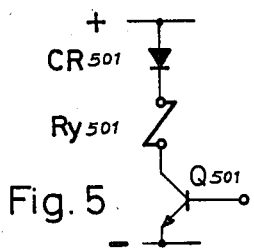
FIG. 5 is a schematic diagram of a circuit of a polarity detecting relay arrangement having a transistor in series with its winding and providing constant current therethrough.

Furthermore, in order to let above-mentioned polarity detecting relay sets act in the different voltage ranges, one can use a conventional control transistor Q501 (FIG. 5) with a constant electric current characteristic to let the relay winding provide current-constant drive in the larger voltage range; or one can use a Zener diode ZD401 (FIG. 4) and an active resistor R401 (FIG. 4) to connect with the relay having a lower active voltage in series for effecting voltage-constant drive in the larger voltage range, so that its active function can be assured.

Moreover, one can select the various components and functions described above to form various designs and to enlarge its applications.

Figure 6:
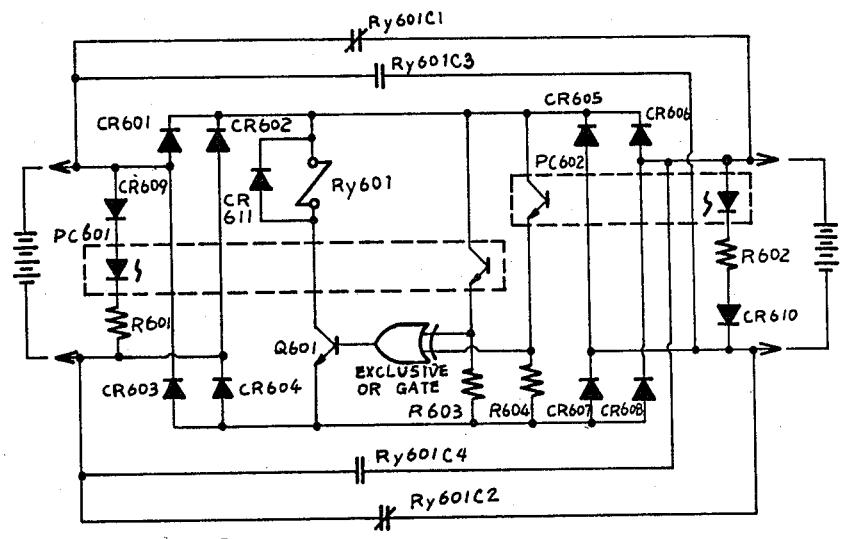
FIG. 6 is a schematic diagram of an interconnecting circuit providing automatic polarity exchange, the circuit being controlled by an exclusive OR gate.

A further design of interconnecting circuit is shown in FIG. 6, in which an exclusive OR gate is used to detect and to control the interconnecting polarity by exchanging automatically the polarities, in case one of the batteries is connected in reverse polarity.

As illustrated in FIG. 6, a preferred embodiment of the interconnecting circuit of the present invention includes a polarity exchange switching circuit having two sets pairs of contacts RY601C1, RY601C2 and RY601C3, RY601C4 of the relay RY601, in which its two connecting contacts of a pair connect to an input of the charging wire and one of double normally closed contacts or double normally opened contacts connects to another input. Its second set of pairs of contacts connect intersectionally, so that two input ends have inverse-parallel connection and parallel-parallel connection, when the polarity exchange relay winding RY601 is energized or is not energized. After its winding RY601 has been connected with a control transistor Q601, it connects with the constant directional power supply in parallel. This relay can be constituted of many types, for example, it may be of the electro-mechanical type relay or the solid-state type.

The circuit of FIG. 6 includes a double set bridge rectifier used for providing respective constant d.c. power supplies. It has double set bridge rectifying circuit composed of diodes CR601, CR602, CR603, CR604 as well as diodes CR605, CR606, CR607 and CR608. Its a.c. inputs connect with two inputs in parallel and its d.c. outputs connect to one another. Therefore, when one of two sets has electricity, then it can supply electric current for the polarity exchange relay inspite of the polarity state of either of the batteries connected with the two inputs.

Polarity detection is provided by dropping resistors R601 and R602, obstructive diodes CR609 and CR610 and two sets of photo-couplers PC601 and PC602 connected respectively with the input ends on two sides in parallel in the positive direction. When the connected polarity of one or the other of the batteries is same as that of its associated obstructive diode, the output of its photo-coupler is switched on. When the connected polarity of the battery is reverse to that of the obstructive diode, the input of the photo-coupler is switched off.

The exclusive OR gate circuit is composed of an IC or an electric circuit component having this logic function and has an output connected with base of the control transistor Q601 and has also two inputs connected with resistors R603 and R604. The resistors R603 and R604 are connected with the output of above-mentioned polarity detecting components for providing the electric signs corresponding to the connected battery polarity.

In operation, when the two inputs connect each other with the same correct polarities respectively, the two input detecting circuits PC601 and PC602 show high or low at the same time and the input of exclusive OR gate shows low. At this moment, the polarity exchange relay winding 601 is not energized.

When two inputs have different polarities, the detecting circuits PC601 and PC602 show a high and a low and the output of exclusive OR gate shows high. The polarity exchange relay winding RY601 is energized and the reverse parallel connection of the battery at two inputs is changed to positive parallel connection, so that the possible damage to the battery or other accidents can be avoided.

The charging protective equipment described in FIGS. 1A, 1B and 2–6 can be further used in conjunction with a charger, i.e. the battery is replaced by the output of d.c. power supply of the charger. The above-said electric circuit can be installed in the housing or on the transmission conducting wire.

Based on the above description, this design uses the polarity detecting relay set to avoid the shortcomings of the conventional charging interconnecting ("jumper") circuit. It has the functions of a fault alarm and provides protection or automatic polarity correction.

What is claimed is:

1. An interconnecting circuit for connecting a first d.c. source to a second d.c. source, the circuit comprising first means responsive to connection polarity of the one voltage source for developing a ONE signal whenever a given connection polarity of the first source is present and a ZERO signal whenever a connection polarity opposite to the given connection polarity of the first source is present; second means responsive to connection polarity of the second d.c. source for developing a ONE signal whenever a given connection polarity of the second source is present and a ZERO signal whenever a connection polarity opposite to the given connection polarity of the second source is present; exclusive OR gate circuit means responsive to the outputs from said first means and said second means for developing a control signal; and relay means having first and second conditions, said relay means being responsive to the control signal, wherein said relay means includes two normally open pairs of contacts for connecting a first terminal of the first source to a first terminal of the second source and a second terminal of the first source to a second terminal of the second whenever the relay means is in its first condition and wherein said relay means further includes two normally closed pairs of contacts for connecting the first terminal of the first source to the second terminal of the second source and the second terminal of the first source to the first terminal of the second source whenever said relay means is in its second condition.

2. The interconnecting circuit according to claim 1, wherein at least one of said d.c. sources is a battery.

3. The interconnecting circuit according to claim 1, wherein each of said d.c. sources is a respective battery.

4. The interconnecting circuit according to claim 1, including a transistor having its base coupled to said exclusive OR gate circuit means and responsive to its output, and wherein said relay means comprises a relay winding connected in series with the emitter-collector path of said transistor.

5. The interconnecting circuit according to claim 4, including a diode connected across said relay winding.

6. The interconnecting circuit according to claim 1, wherein said first and second means comprise respective first and second light emitting diodes and respective first and second light responsive transistors optically coupled respectively to respective said light emitting diodes.

7. The interconnecting circuit according to claim 1, including respective bridge rectifiers coupled respectively to said first and second d.c. sources for supply voltage of a given polarity to the interconnecting circuit at all times regardless of the connected polarities thereof.

8. An interconnecting circuit for connecting a first d.c. source to a second d.c. source, the circuit comprising a first conductive connection extending between one terminal of the first source and one terminal of the second source, said first conductive connection including a first pair of relay contacts and a second pair of relay contacts; a second conductive connection extending between a second terminal of the first source and a second terminal of the second source, said second conductive connection being free of relay contacts; a first polarity responsive circuit including a first relay winding coupled across said first d.c. source for energizing said first relay winding whenever the first d.c. source is connected in a given polarity, said first pair of contacts being closed whenever said first relay winding is energized; and a second polarity responsive circuit including a second relay winding coupled across said second d.c. source for energizing said second relay winding whenever said second d.c. source is connected in the given polarity, said second pair of contacts being closed whenever said second relay winding is energized.

9. The interconnecting circuit according to claim 8, including respective diodes connected in series with respective said first relay winding and said second relay winding.

10. The interconnecting circuit according to claim 9, including respective Zener diodes connected in series with respective ones of the first said diodes, said Zener diodes being poled opposite from the first said diodes.

11. The interconnecting circuit of claim 9, including respective light emitting diodes respectively connected in parallel with the respective first said diodes, said light emitting diodes being poled opposite from the first said diodes, the light emitting diodes emitting light whenever the associated one of the d.c. sources is incorrectly poled.

12. The interconnecting circuit of claim 11, including respective resistors connected respectively in series with said light emitting diodes in parallel with the respective first said diodes.

13. The interconnecting circuit according to claim 9, wherein said respective diodes comprise a first diode and a second diode, said circuit further, including a respective first and second capacitor respectively connected across said first relay winding and said second relay winding, and respective first and second resistors, connected respectively in series circuit between respective said first and second diodes and respective said first relay winding and second relay winding.

14. The interconnecting circuit according to claim 8, including respective Zener diodes connected respectively across said first relay winding and said second relay winding.

15. The interconnecting circuit according to claim 8, including respective first and second transistors having their respective emitter-collector paths connected in series with said first relay winding and said second relay winding, respectively.

16. The interconnecting circuit according to claim 8, wherein at least one of said d.c. sources is a battery.

17. The interconnecting circuit according to claim 8, wherein each of said d.c. sources is a respective battery.

* * * * *